US006963415B1

(12) United States Patent
Saito

(10) Patent No.: US 6,963,415 B1
(45) Date of Patent: Nov. 8, 2005

(54) RECORDING APPARATUS

(75) Inventor: Hiroyuki Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,225

(22) Filed: Oct. 22, 1999

(30) Foreign Application Priority Data

Oct. 26, 1998 (JP) ................................ 10-321306

(51) Int. Cl.[7] ............................ B41F 3/58; H02P 8/00
(52) U.S. Cl. .................... 358/1.14; 358/1.16; 318/696
(58) Field of Search ............................ 358/1.14, 1.16, 358/1.17, 1.9; 318/671, 672, 683, 685, 696

(56) References Cited

U.S. PATENT DOCUMENTS

| | | | | | |
|---|---|---|---|---|---|
| 4,214,194 | A | * | 7/1980 | Horning | 318/696 |
| 4,706,008 | A | * | 11/1987 | Cronch et al. | 318/696 |
| 4,742,287 | A | * | 5/1988 | Yokoi et al. | 318/696 |
| 4,831,319 | A | * | 5/1989 | Heinrich et al. | 318/696 |
| 5,007,751 | A | * | 4/1991 | Yamakawa | 400/322 |
| 5,040,234 | A | * | 8/1991 | Yamamoto et al. | 388/811 |
| 5,416,395 | A | * | 5/1995 | Hiramatsu et al. | 318/600 |
| 5,825,151 | A | * | 10/1998 | Ikawa et al. | 318/685 |
| 6,075,336 | A | * | 6/2000 | Sugai et al. | 318/696 |
| 6,141,110 | A | * | 10/2000 | Isozaki | 358/1.12 |
| 6,144,184 | A | * | 11/2000 | Yamaguchi | 318/696 |

* cited by examiner

*Primary Examiner*—Joseph R. Pokrzywa
(74) *Attorney, Agent, or Firm*—Fitzpatrick, Cella, Harper & Scinto

(57) ABSTRACT

The present invention provides a recording apparatus provided with a stepping motor as an actuator, comprising storage means for storing and holding a last exciting phase of the motor at the time of software power off and control means for, at the time of restarting from a software power off state, starting excitation from the final exciting phase without performing phase alignment of the motor, wherein starting can constantly be performed from a state in which the electrical and mechanical phases of the motor are equal to each other, so that the generation of noise or slight vibration can be minimized.

18 Claims, 10 Drawing Sheets

RECORDING APPARATUS

BACKGROUND OF THE INVENTION

1. Field of the Invention

The present invention relates to a recording apparatus having a stepping motor as an actuator, particularly to a recording apparatus equipped with a sleep mode for suppressing power consumption at the time of software power off.

2. Related Background Art

In recent years, with an increasing demand for reduction of power consumption, a machine provided with a sleep mode has been developed in which an unnecessary circuit is not operated in a software power off state, and CPU clock is further lowered to suppress the power consumption. Additionally, there has also been a machine in which only a pilot lamp for informing a user is turned off even in the software power off state. The machine is on standby while the power consumption is substantially unchanged. However, this cannot be assumed to be placed in the sleep mode.

In a recording apparatus using a stepping motor as an actuator, even when the device is started from either a hardware power on state or from a sleep mode, a motor mechanical phase (angle) (rotor position) is not seen. Therefore, to equalize a motor electrical phase (angle) (exciting phase) with the mechanical phase, pulses for one or more cycles are inputted at a low frequency within an automatic starting area and in at least the electrical phase to perform phase alignment.

The states of the electrical and mechanical phases during starting are shown in FIGS. 10A to 10D. In the drawings, for the description, it is assumed that the motor is driven in two-phase excitation and stopped in two phase positions without considering any detent. An arrow indicates the electrical phase (exciting phase), and ∇ indicates the mechanical phase. In FIG. 10A, since the electrical phase is equal to the mechanical phase, the device smoothly starts up without causing any positional deviation. In FIGS. 10B and 10D, however, since the electrical phase deviates from the mechanical phase by 90 degrees, positional deviation occurs by this phase difference during starting. Furthermore, when through-up occurs excessively steeply, loss of synchronism occurs in worst cases. In FIG. 10C, since the phase difference is 180 degrees, there is a high possibility that not only the positional deviation but also the loss of synchronism occurs. To avoid the worst situation of loss of synchronism, as described above, the phase alignment has been performed which comprises inputting the pulses for one or more cycles at the low frequency within the automatic starting area in which there is a sufficient torque and in at least the electrical phase to equalize the electrical phase with the mechanical phase.

In the conventional method, however, when the electrical and mechanical phases of the stepping motor are actually different from each other, a targeted effect can be obtained. However, the phase alignment is performed even during starting from the state of FIG. 10A (the electrical phase is equal to the mechanical phase). Therefore, when some pulses of low frequencies are inputted in the automatic starting area where there is a sufficient torque, noise or slight vibration is unfavorably generated.

SUMMARY OF THE INVENTION

The present invention has been developed in consideration of the above-described actual circumstances, and an object thereof is to drive a stepping motor for use in a recording apparatus in an optimum state.

Another object of the present invention is not to perform phase alignment when the phase of the stepping motor is aligned during restarting, and to perform the phase alignment when the phase of the stepping motor is not aligned.

Further objects of the present invention would be apparent from concrete embodiments described below.

DESCRIPTION OF THE PREFERRED EMBODIMENTS

Embodiments of the present invention will be described hereinafter with reference to the drawings.

First Embodiment

Figure 1:
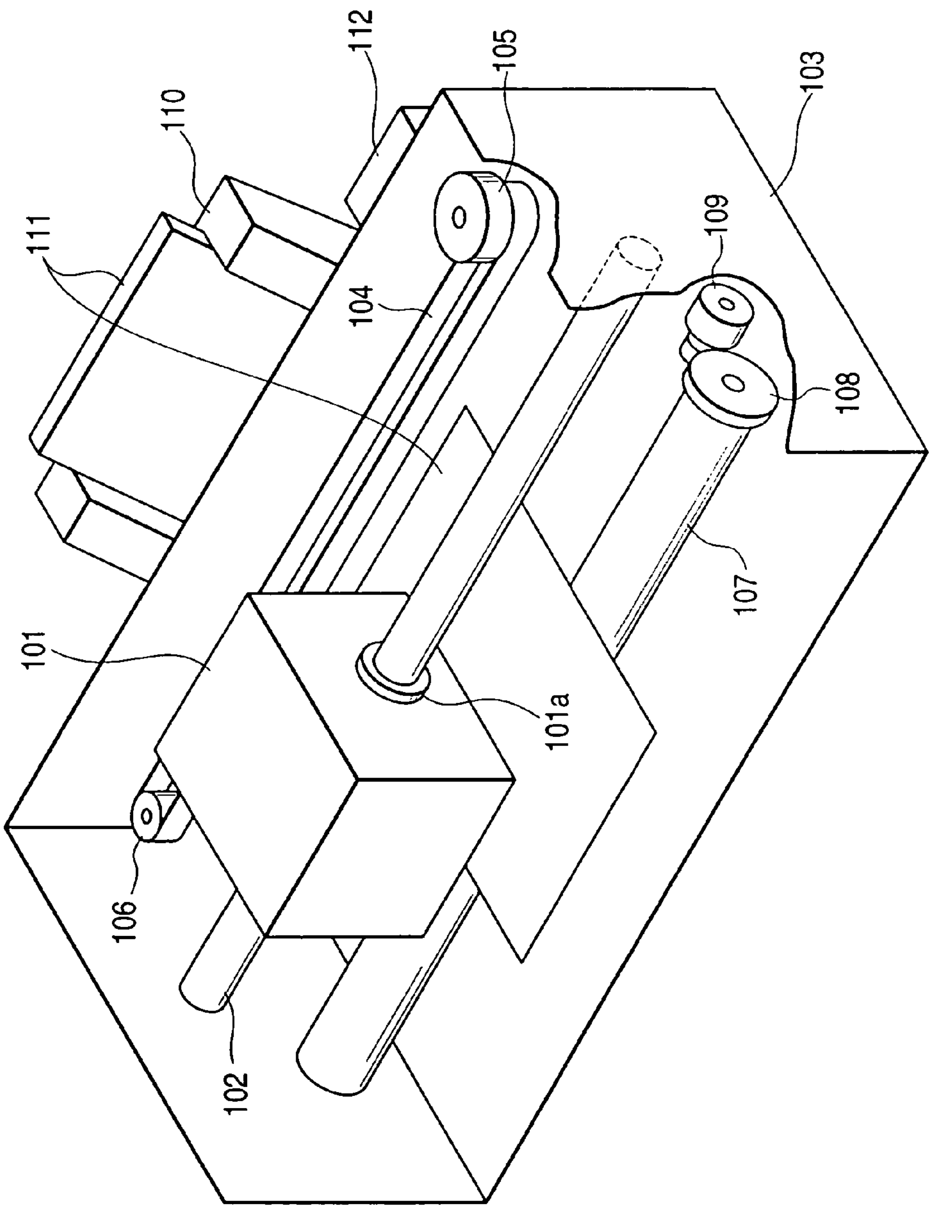
FIG. 1 is a perspective view best showing the characteristics of a recording apparatus according to a first embodiment of the present invention.

In a first embodiment, a serial ink jet printer provided with a recording head with an ink tank attached thereto will be described as an example. FIG. 1 is a schematic view of the serial ink jet printer showing the mechanism of the present invention. In FIG. 1, numeral 101 denotes a carriage which has an ink tank and also serves as a recording head. A bearing 101*a* fixed to the carriage 101 is impregnated with lubricating oil, a guide shaft 102 is inserted slidably in a main scanning direction, and both ends of the guide shaft 102 are fixed to a chassis 103. Drive of a carriage drive motor (hereinafter referred to as CR motor) 105 is transmitted via a belt 104 as carriage drive transfer means engaged with the carriage 101, so that the carriage 101 can move in the main scanning direction. Here, an idler pulley 106 is disposed on the side opposite to the CR motor 105 via the belt 104.

When a printing material 111 is on standby for printing, it is stacked on sheet supply means 110. When the printing starts, the printing material 111 is supplied by pickup means (not shown). Thereafter, in synchronism with the reciprocating movement of the carriage 101, the printing material 111 is conveyed by a conveying roller 107 by an appropriate feed amount in a sub-scanning direction at an appropriate time, and the printing is performed. The conveying roller 107 is rotated/moved by the drive force of a conveying motor (hereinafter referred to as LF motor) 109 via a press-inserted conveying drive gear 108. After the printing is completed, the printing material 111 is discharged by the conveying roller 107 and discharging means (not shown).

Here, the drive of the carriage motor 105, LF motor 109, pickup means (not shown), and recording head in the carriage 101 is controlled by a controller 112.

Figure 2:
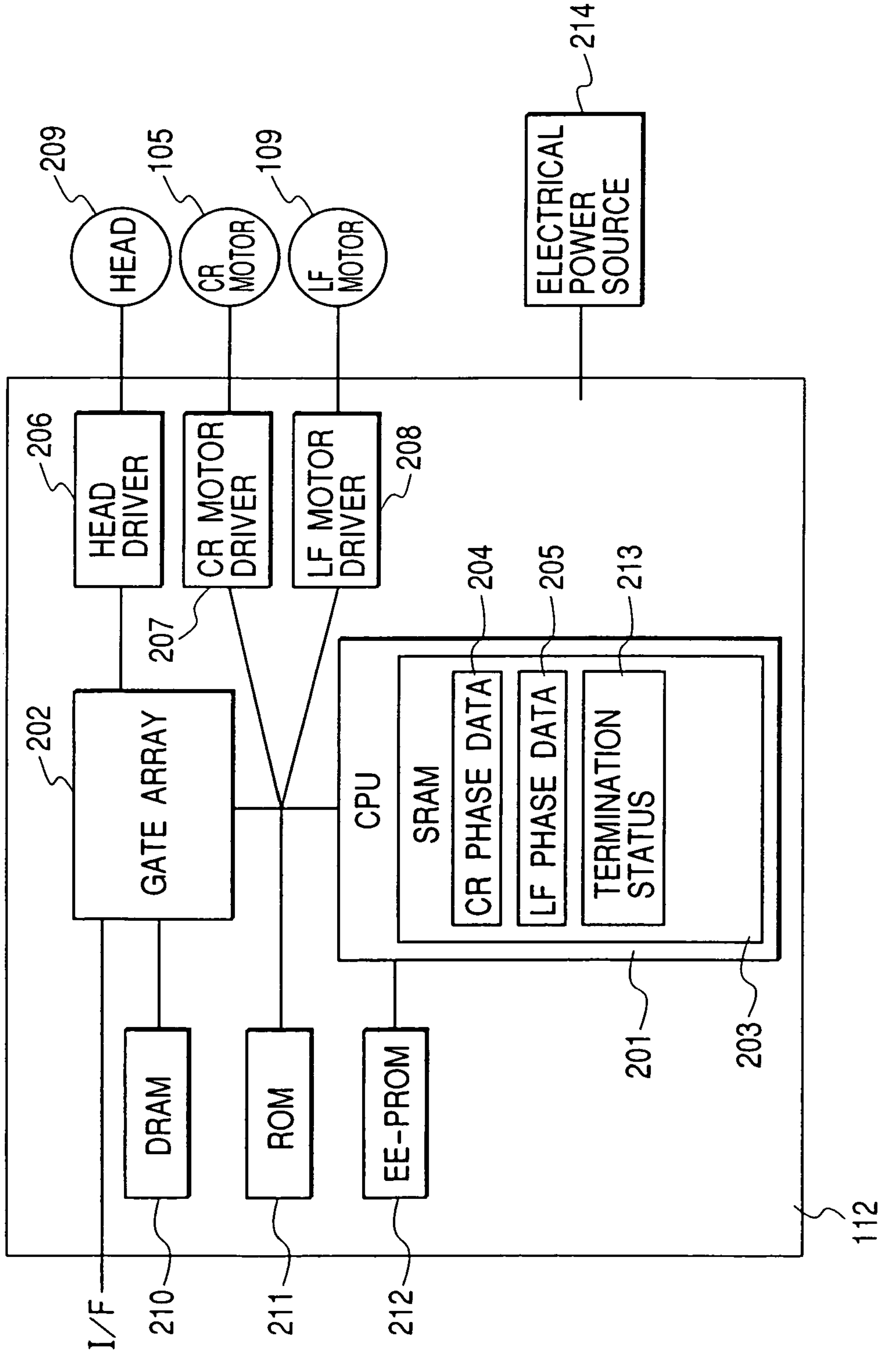
FIG. 2 is a circuit block diagram of a controller according to the first embodiment of the present invention.

FIG. 2 is a block diagram of the controller 112. The controller is provided with a power supply 214 for operating the recording apparatus, a CPU 201 as a central processing calculation circuit, and a gate array 202. The image data transmitted from an interface is developed and processed in DRAM 210, the CR motor 105 and the LF motor 109 are driven by drivers 207 and 208, respectively, and a head 209 is controlled via a head driver 206 to perform the printing. A program for controlling the printer is stored in ROM 211, and the CPU 201 and the gate array 202 operate under program instructions. Numeral 212 is an EE-PROM for holding written information even in a hardware power off state, in which printer status information such as the number of accumulated/printed sheets are stored. A SRAM 203 is disposed inside the CPU 201, in which stored are CR phase data 204 as the phase data of CR motor 105 and LF motor, LF phase data 205, and termination status data 213 indicating whether the printer is normally or erroneously terminated at the time of software power off. The SRAM does not necessarily exist inside the CPU, and may be any memory as long as storage can be kept even in a sleep mode.

To reduce the power consumption, when the user softly turns off power, the printer enters the sleep mode (the printer may automatically be placed into the sleep mode by counting continuous unused time, and the like by a timer), only the logic signal is enabled, the power supply to the head 209, the CR motor 105, and the LF motor 109 is cut, and clock down is further performed. In the sleep mode the RAM information other than the SRAM 203 mounted inside the CPU 201 are all deleted. The information of an exciting phase to stop the CR motor 105 and the LF motor 109 at the time of software power off are written in the CR phase data 204 and the LF phase data 205, respectively, and the presence/absence of an error is written into the termination status data 213 at the time of software power off.

Figure 3:
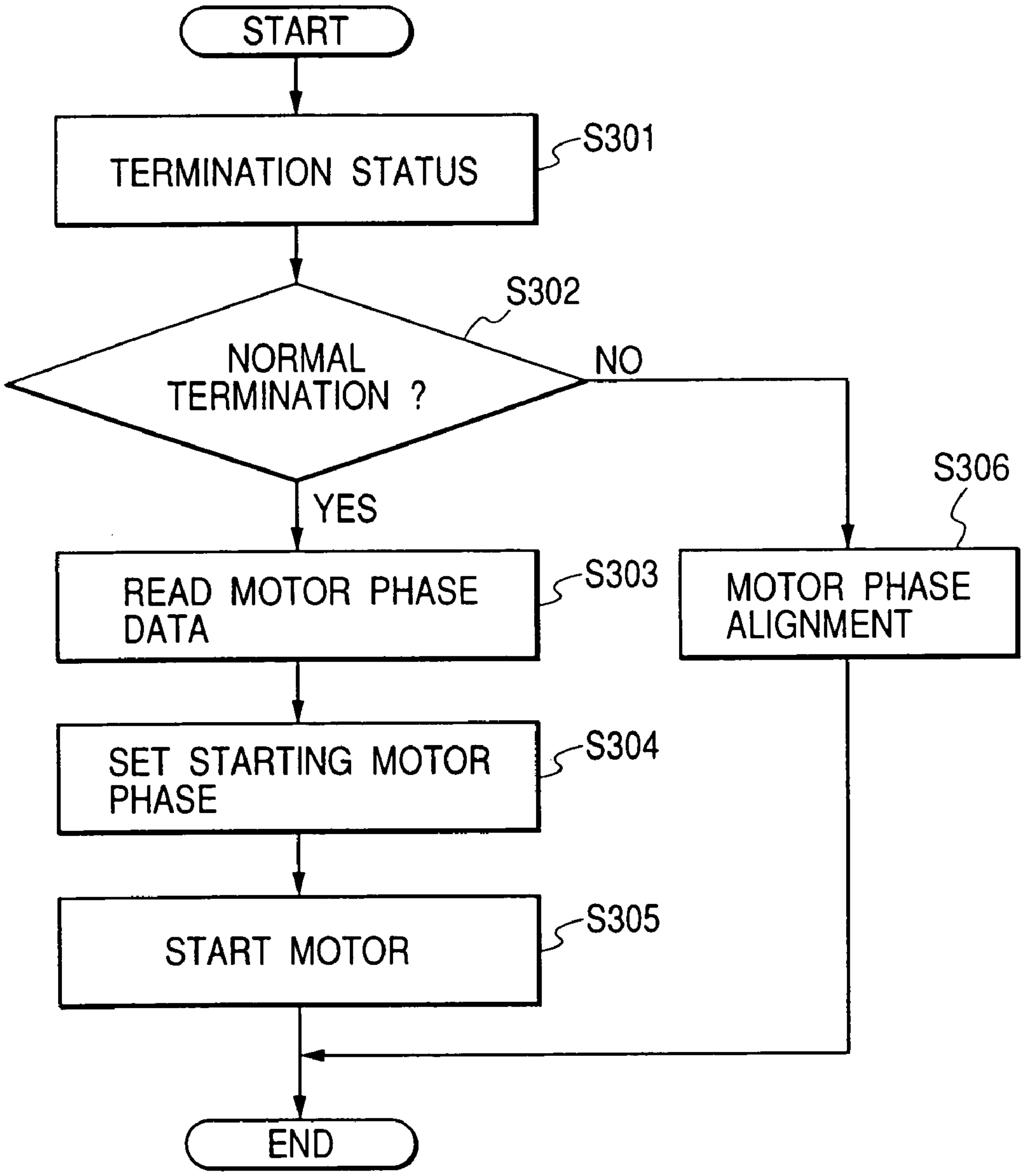
FIG. 3 is a flowchart showing an operation procedure according to the first embodiment of the present invention.
Figure 10A:
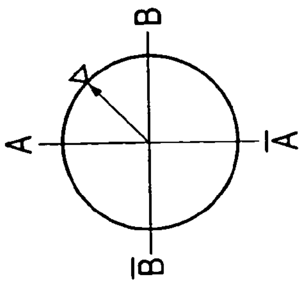
FIGS. 10A, 10B, 10C and 10D are schematic diagrams showing the states of a mechanical phase (angle) and an electrical phase (angle) of a stepping motor.

A procedure for returning from the sleep mode will next be described with reference to the flowchart of FIG. 3. When the user depresses a power on key (not shown), a returning sequence starts. At step S301 the termination status data 213 when entering the sleep mode is confirmed. In case of normal termination (step S302), the CR phase data 204 and the LF phase data 205 written in the SRAM 203 at the time of software power off are read (step S303). The read CR phase data 204 and the LF phase data 205 are set in the data area of start exciting phase (step S304), and the motors are started (step S305). Since the user does not perform the hardware power off or the error termination, a motor rotor is in the sleep state. A probability that a change occurs from the state at the time of software power off is close to zero. Therefore, when the electrical phase is equal to the mechanical phase (state of FIG. 10A), the software power off is performed. Even at the time of software power on, while the phases are equal to each other, the motor is started. Therefore, since no phase alignment needs to be performed, the drive in the low frequency area with a large torque can be minimized, and the starting with less noise or vibration is possible.

When the error termination is judged at step S302, it can be considered that the error is generated because the motor comes out of step, and there is a high possibility that each motor mechanical phase is different from the stored motor phase data. Therefore, motor phase alignment is performed to align the mechanical and electrical phases (step S306). Additionally, since there is also a high possibility that the error occurs without any motor loss of synchronism, the start exciting phase of phase alignment is preferably also started from the phase data stored in the SRAM 203 in order to avoid the noise or vibration generated by the positional deviation during starting to the utmost.

As described above, by rising from the motor phase stored at the time of software power off, a quiet starting can be realized with less vibration.

In the embodiment since the phase data at the time of software power off is stored in the SRAM 203, the data is deleted at the time of hardware power off. Since movement or transport is considered to be mainly performed at the time of hardware power off, it is expected that the motor phase deviates, and motor phase alignment is needed. From this idea, it is judged that the phase data is unnecessary, but the phase data may be stored in non-volatile EE-PROM 212 kept even at the time of hardware power off.

Moreover, when the object motor is a stepping motor, it can similarly be handled, and the present invention may be applied to printing material sheet supply means, head maintenance mechanism drive means, and the like (these means are not shown).

Second Embodiment

Figure 4:
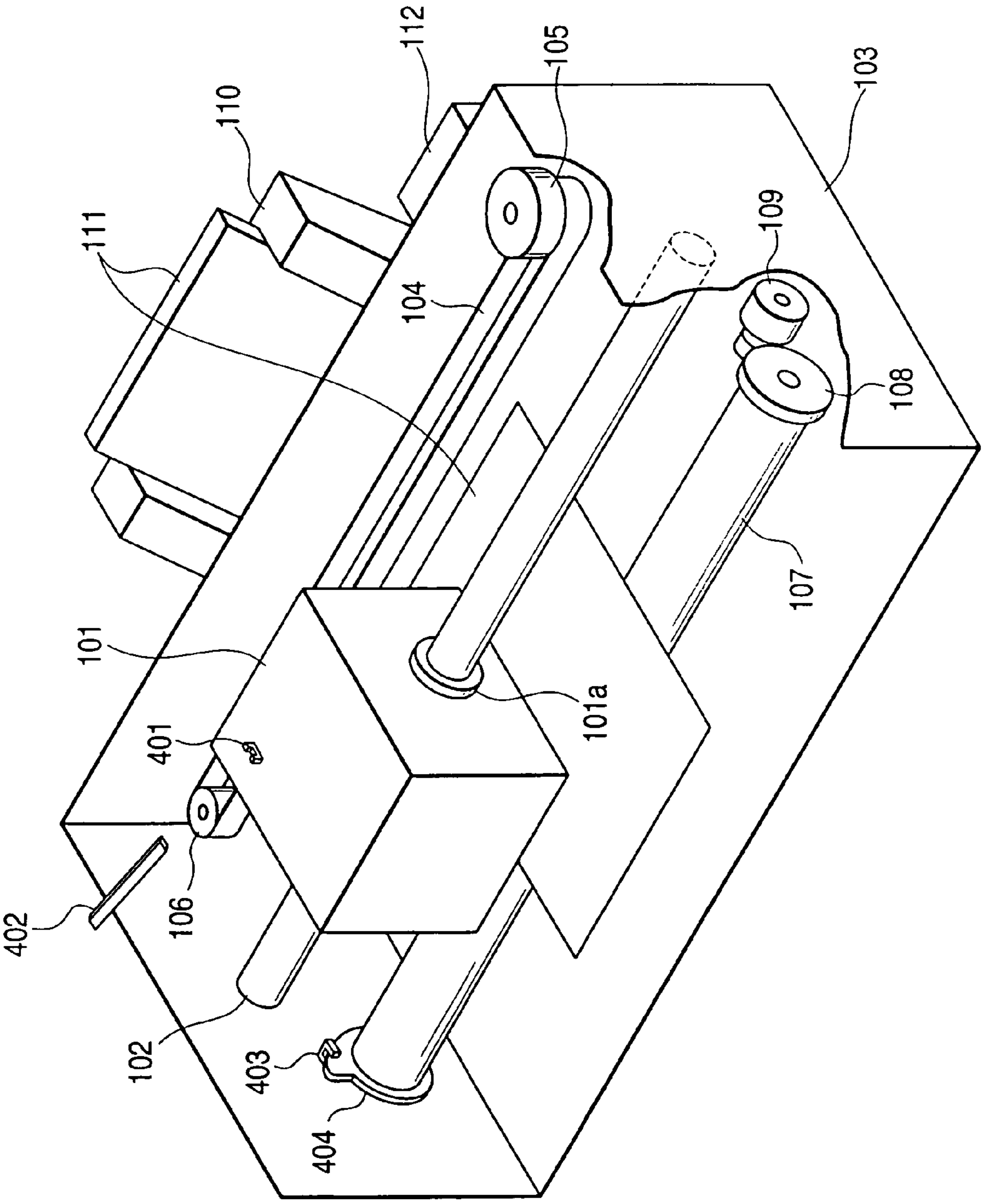
FIG. 4 is a perspective view best showing the characteristics of the recording apparatus according to a second embodiment of the present invention.

FIG. 4 is a schematic view of the serial ink jet printer showing the mechanism according to a second embodiment of the present invention, and the same reference numerals as those of the first embodiment provide the same elements, structures and functions unless otherwise described.

In FIG. 4, a CR sensor (photo sensor) 401 is mounted on the carriage 101 to judge the position of the carriage 101 by detecting whether a shielding plate 402 intercepts the CR sensor. The CR shielding plate 402 is disposed on a home position side (where the carriage is on standby in the sleep mode), and the CR sensor 401 is intercepted in the sleep state (OFF state). The CR sensor 401 returns from the sleep state, moves by the predetermined number of pulses (toward the right in FIG. 4), and transmits light (ON state).

Numeral 403 denotes an LF sensor (photo sensor) for detecting the rotating phase of the conveying roller, and judgment is made when an LF shielding plate 404 press-inserted to the conveying roller 107 intercepts the LF sensor. The LF sensor is on standby in the sleep state while the LF shielding plate is intercepted in the home position (OFF state). The LF sensor 401 returns from the sleep state, moves by the predetermined number of pulses (by one cycle of the LF shielding plate), transmits light midway during rotation (ON state), and is again shielded (OFF state).

Figure 5:
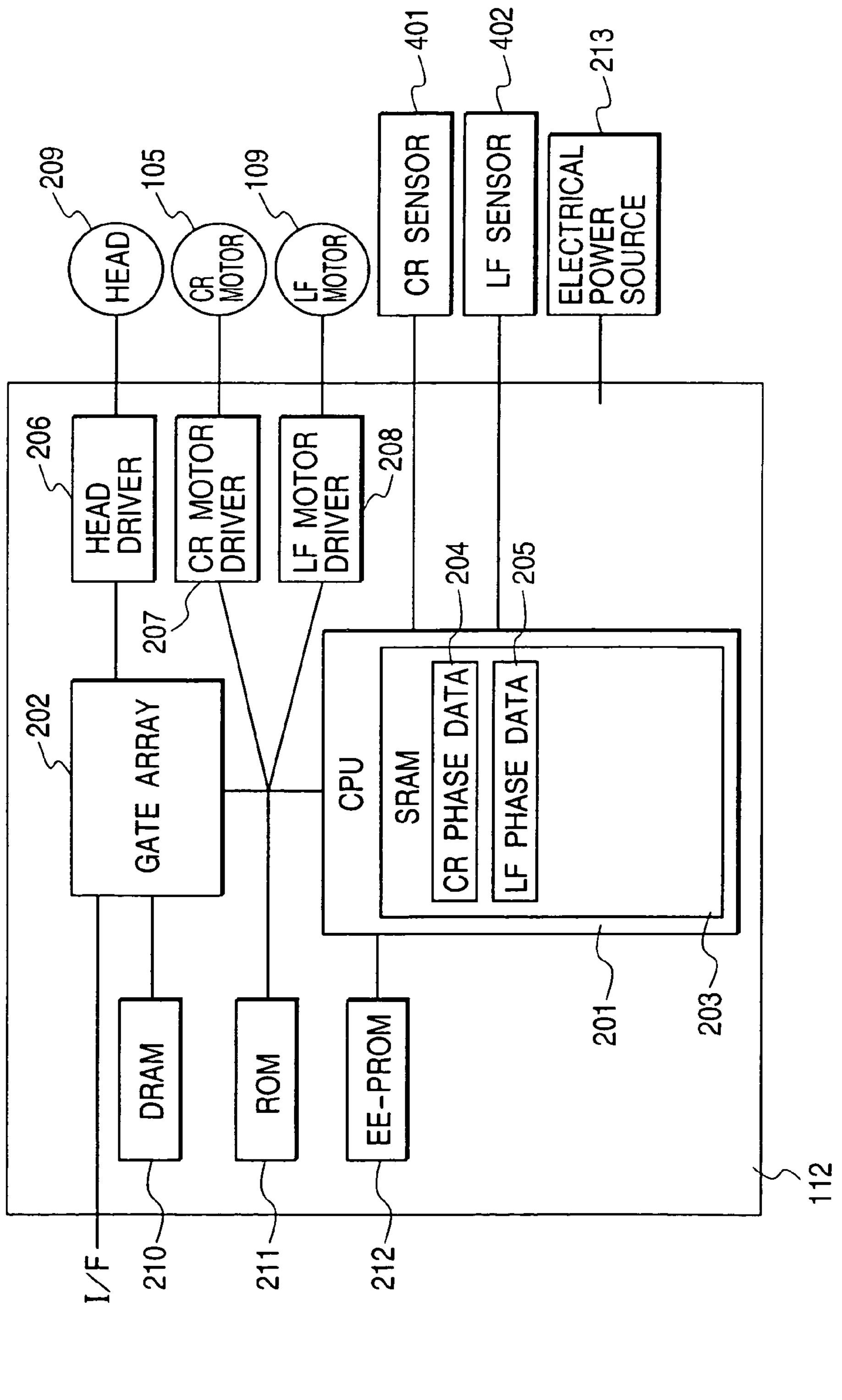
FIG. 5 is a circuit block diagram of the controller according to the second embodiment of the present invention.

FIG. 5 is a block diagram of the controller 112 according to the second embodiment. Herein the same reference numerals as those of the first embodiment provide the same elements, structures and functions unless otherwise described. The states of CR sensor 401 and LF sensor 403 of FIG. 4 are monitored by the CPU 201.

In the same manner as in the first embodiment, the information of the exciting phase to stop the CR motor 105 and the LF motor 109 when entering the sleep mode, that is, at the time of software power off are written in the CR phase data 204 and the LF phase data 205, respectively.

Figure 6:
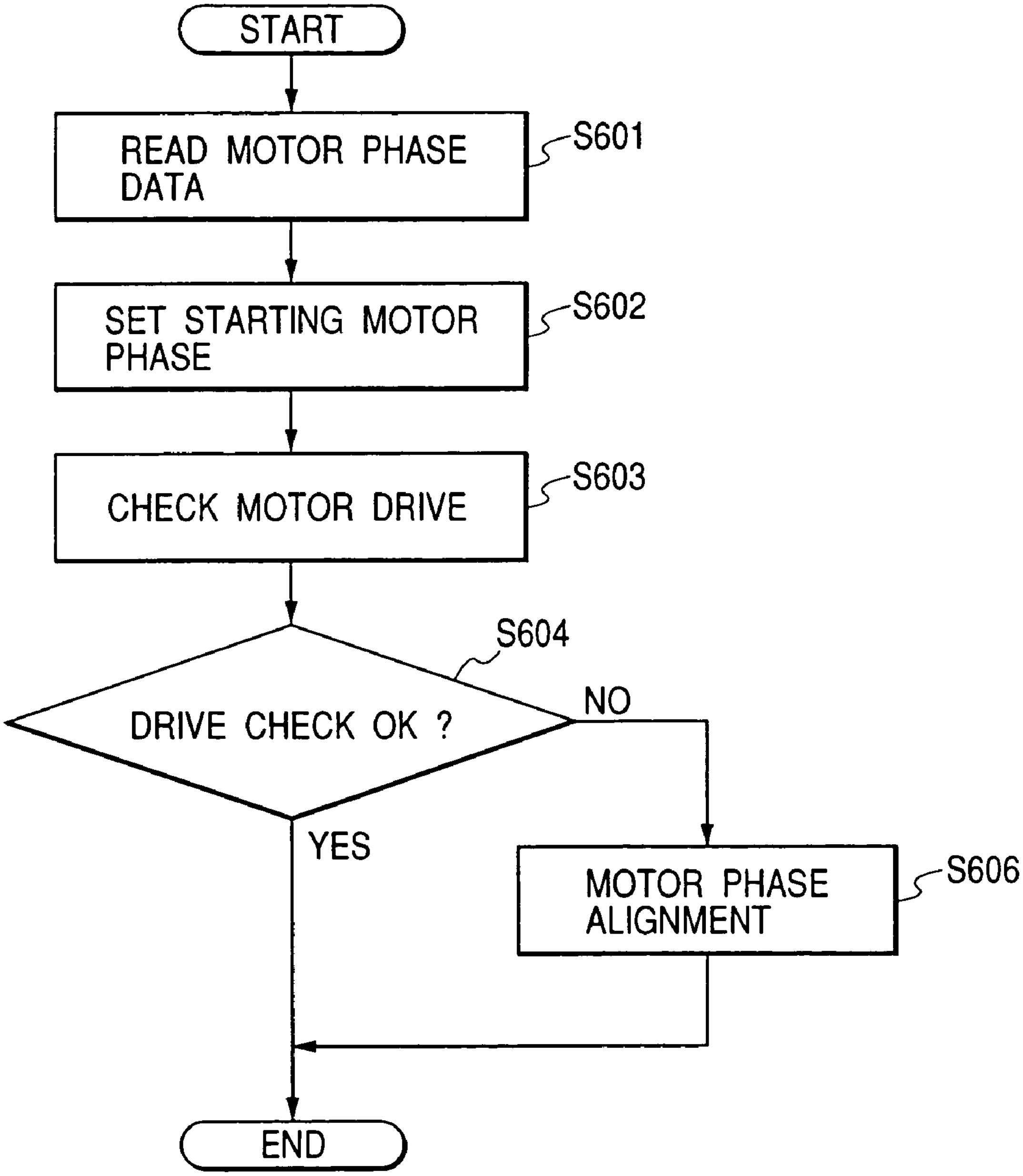
FIG. 6 is a flowchart showing the operation procedure according to the second embodiment of the present invention.

The procedure for returning from the sleep state will be described with reference to the flowchart of FIG. 6. When the sequence starts, first the CR phase data 204 and the LF phase data 205 written at the time of software power off are read (step S601). The read CR phase data 204 and the LF phase data 205 are set in the data area of start exciting phase (step S602), and the motors are started. The CR motor 105 is driven to a position where the CR sensor 401 is released from the CR shielding plate 402, and the LF motor 109 is driven by one cycle of the LF shielding plate 404 (Of course, judgment may be made by a smaller feed amount than one cycle by defining LF shielding area). The outputs of CR sensor 401 and LF sensor 403 are monitored midway during driving, and it is checked whether the motors are driven without any loss of synchronism (whether the CR sensor 401 leaves the CR shielding plate at the predetermined timing, whether the LF sensor 403 emits the corresponding output to the LF shielding plate) (step S603). When there is no abnormality in the drive check (step S604), the motor starting is completed. When an abnormality is detected (step S604), it is judged that the motor is out of step, and motor phase alignment is performed (step S606).

Figure 10B:
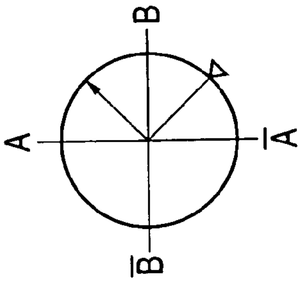
Figure 10C:
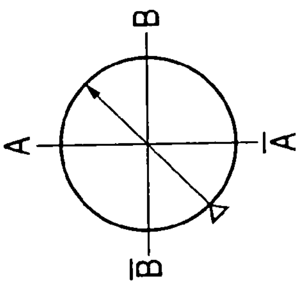
Figure 10D:
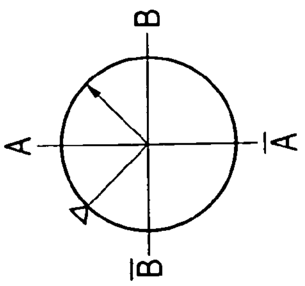

In the embodiment, not only when the motor mechanical phase coincides with the electrical phase (state of FIG. 10A) but also when there is an initial positional deviation recovery but there is no loss of synchronism (e.g., states of FIG. 10B, 10D), quiet starting can be realized without performing the phase alignment (a slight noise is made at the time of the initial positional deviation recovery, but it is quieter than at the time of phase alignment). Furthermore, it is confirmed whether the motor comes out of step (step S604), and the phase alignment then follows (step S606). Therefore, there is neither loss of synchronism nor error termination during starting.

Moreover, the phase data may be stored in the EE-PROM 212 not in the SRAM 203 also in the second embodiment.

Furthermore, when the object motor is a stepping motor, it can similarly be handled, and the present invention may be applied to the printing material sheet supply means, the head maintenance mechanism drive means, and the like (these means are not shown).

Third Embodiment

Figure 7:
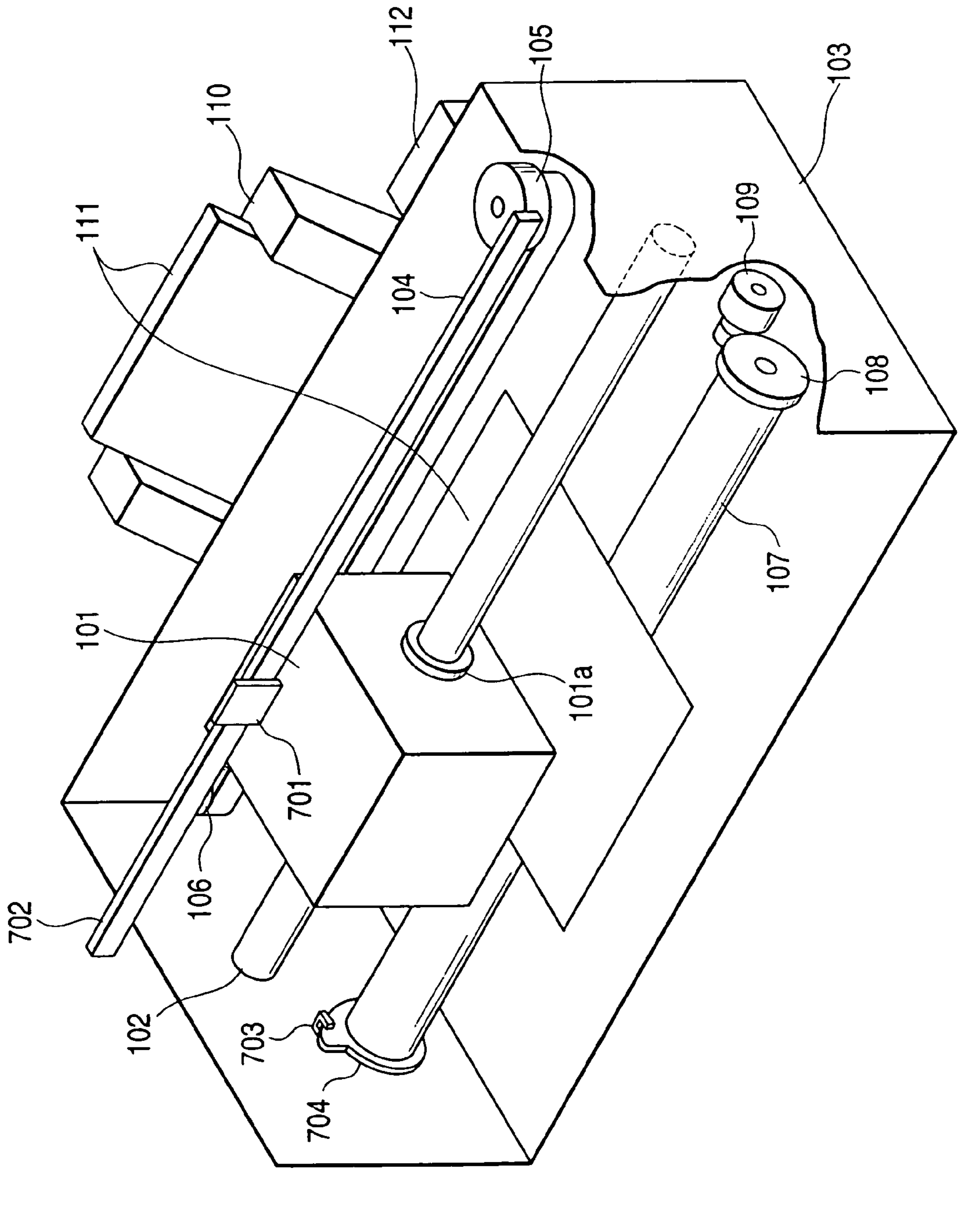
FIG. 7 is a perspective view best showing the characteristics of the recording apparatus according to a third embodiment of the present invention.

FIG. 7 is a schematic view of the serial ink jet printer showing the mechanism according to a third embodiment of the present invention, and the same reference numerals as those of the first embodiment provide the same elements, structures and functions unless otherwise described.

In FIG. 7, an optical linear encoder scale 702 is read by CR encoder sensor 701 mounted on the carriage 101, and the position of the carriage 101 corresponding to the rotating amount of the CR motor 105 is monitored. An optical rotary encoder scale 704 is read by LF encoder sensor 703, and the rotating amount of the conveying roller 107 corresponding to the rotating amount of the LF motor 109 is monitored.

Figure 8:
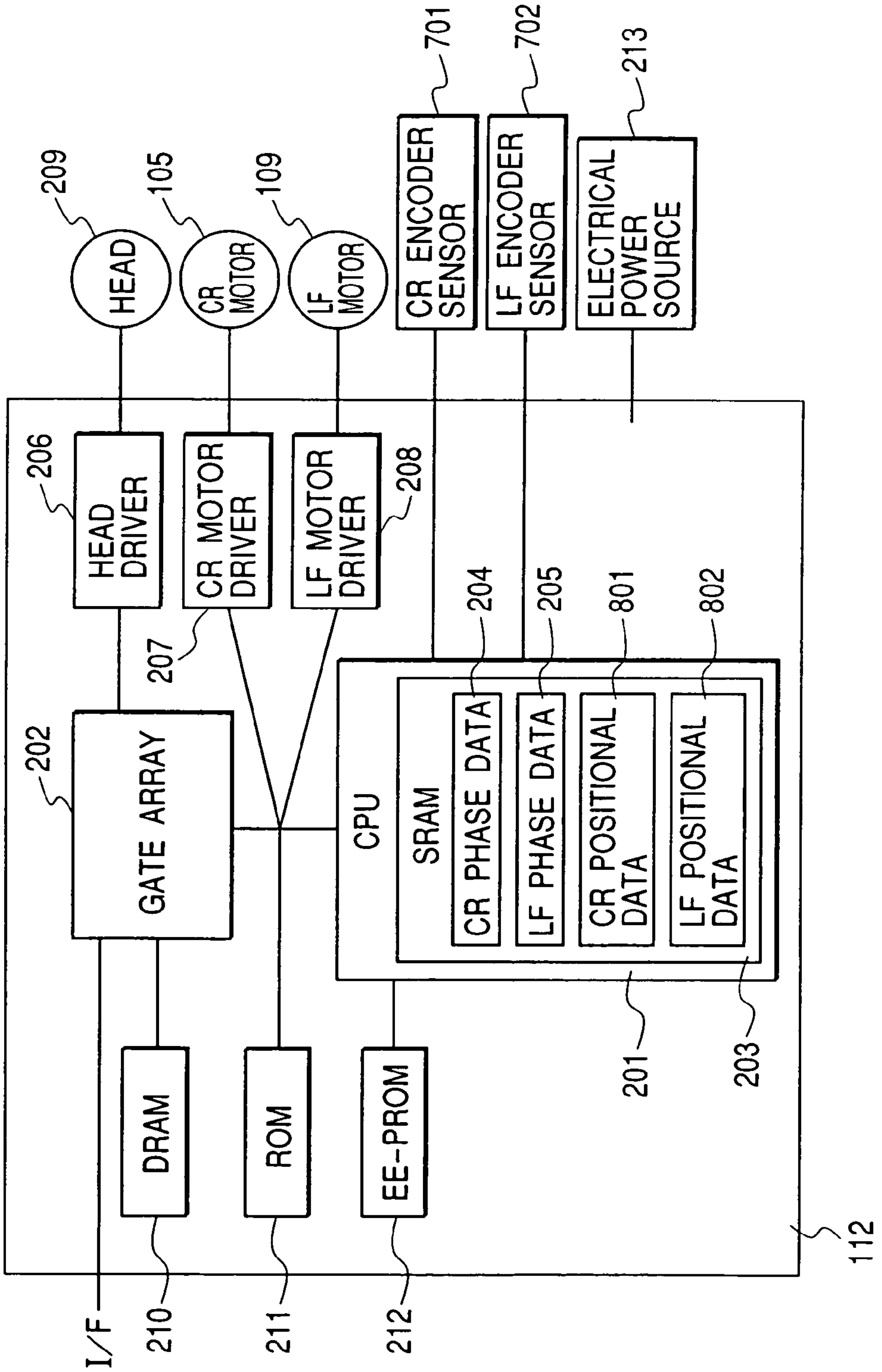
FIG. 8 is a circuit block diagram of the controller according to the third embodiment of the present invention.

FIG. 8 is a block diagram of the controller 112 according to the third embodiment, and the same reference numerals as those of the first embodiment provide the same elements, structures and functions unless otherwise described.

When the CPU 201 monitors the states of the CR encoder sensor 701 and LF encoder sensor 703 of FIG. 7, the carriage position and the conveying roller rotating position are grasped. CR positional data 801 and LF positional data 802 are data of carriage position and conveying roller rotating amount obtained from the CR encoder sensor 701 and the LF encoder sensor 703, respectively, and are stored in the SRAM 203.

In the same manner as in the first embodiment, the information of the exciting phase to stop the CR motor 105 and the LF motor 109 when entering the sleep mode, that is, at the time of software power off are written in the CR phase data 204 and the LF phase data 205, respectively. Additionally, the states of the CR encoder sensor 701 and the LF encoder sensor 703 are continuously monitored in the sleep state, and the positions (rotating amount) of the carriage 101 and the conveying roller are continuously written to the CR positional data 801 and the LF positional data 802.

Figure 9:
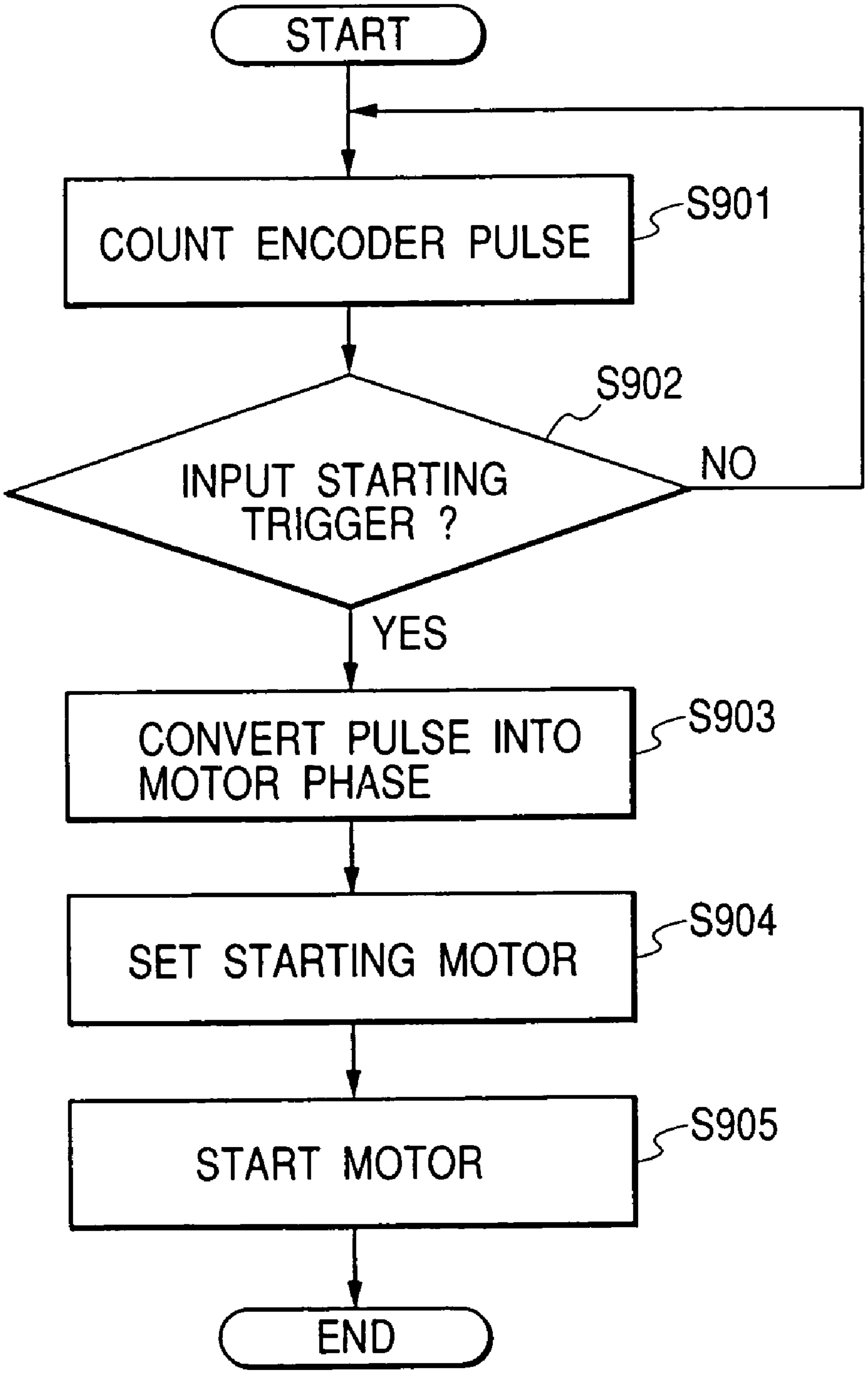
FIG. 9 is a flowchart showing the operation procedure according to the third embodiment of the present invention.

The procedure for returning from the sleep state will be described with reference to the flowchart of FIG. 9. First, in the sleep state, the pulses of the CR encoder sensor 701 and the LF encoder sensor 703 are counted, and the CR positional data 801 and the LF positional data 802 are continuously written to the SRAM 203 as described above (step S901). When a trigger of software power on is applied (step S902), the CR positional data 801 and the LF positional data 802 are converted to the exciting phase data of the CR motor 105 and the LF motor 109, respectively, and the CR phase data 204 and the LF phase data 205 compatible with the motor rotor position (mechanical phase) at that time are written to the SRAM 203 (step S903). The data are set in the data area of the start exciting phase (step S602), and the motors are started.

By the above-described procedure the positions (rotation) of the carriage 101 and the conveying roller 107 are always monitored, and excitation is performed from the exciting phase corresponding to the position (rotation amount) during the motor starting. Even when the carriage 101 and the conveying roller 107 move (rotate) in the sleep state, the positional deviation or the loss of synchronism in the initial starting stage is not generated (state of FIG. 10A), so that a quiet motor starting can constantly be realized.

The linear encoder is used for detecting the position of the carriage 101, but the rotary encoder may directly be attached to the CR motor 105 to directly monitor the motor phase, and the rotary encoder may similarly be attached to the LF motor.

Moreover, also in the third embodiment, the phase data may be stored in the EE-PROM 212, not in the SRAM 201.

Furthermore, when the object motor is a stepping motor, it can similarly be handled, and the present invention may be applied to the printing material sheet supply means, the head maintenance mechanism drive means, and the like (these means are not shown).

As described above, in the recording apparatus having the stepping motor as the actuator, when the phase data at the time of motor stop is held in the sleep mode in which the power of the recording apparatus is softly turned off, and the motor is started up from the stored phase, the positional deviation generated during the phase alignment and the vibration and noise by the excessively large torque can be avoided. Moreover, only when there is a possibility that the motor phase deviates, the phase alignment is appropriately be performed. Therefore, the probability of the generation of vibration and noise can be reduced, and additionally a stable motor starting can be performed. Furthermore, by also using the encoder and other position detecting means and directly or indirectly monitoring the motor rotating amount in the sleep state, the motor starting can be realized without requiring the phase alignment.

What is claimed is:

1. A recording apparatus provided with a stepping motor as an actuator, comprising:

storage means for storing and holding information regarding a final exciting phase of the stepping motor upon entering a software power off state in which consumption of electrical power of said recording apparatus is restricted by changing a condition of a clock signal to control said recording apparatus; and control means for starting excitation of the stepping motor based on the information regarding the final exciting phase, read out from said storage means, without performing phase alignment of the stepping motor, when said recording apparatus restarts from the software power off state, said control means performing a phase alignment of said stepping motor at a state of hardware power off, wherein the phase alignment of said stepping motor is a process for driving said stepping motor with a predetermined number of pulses to equalize a mechanical phase with an electrical phase of said stepping motor.

2. The recording apparatus according to claim 1, wherein said recording apparatus is a serial type recording apparatus.

3. The recording apparatus according to claim 2, wherein the stepping motor is one of a carriage driving motor, a print medium conveying motor, a print medium feeding motor, and a motor for driving a recording head maintenance mechanism.

4. The recording apparatus according to claim 1, wherein the phase alignment of the stepping motor is performed in a manner so that the stepping motor is driven at a self-starting region of the stepping motor.

5. The recording apparatus according to claim 1, wherein said storage means is a non-volatile memory.

6. The recording apparatus according to claim 1, wherein said storage means is provided within said control means.

7. The recording apparatus according to claim 1, wherein the state of power on is shifted to the state of software power off if said apparatus is not in use for a long time.

8. A recording apparatus provided with a stepping motor as an actuator, comprising:

storage means for storing and holding information regarding a final exciting phase of the stepping motor and information regarding a termination status indicating the presence/absence of an error in said recording apparatus at the transition to a software power off in which a consumption electrical power is restricted by changing a condition of clock signal to control said recording apparatus; and control means for, when said recording apparatus restarts from the software power off state, starting excitation of the stepping motor based on the information regarding the final exciting phase, read out from said storage means, without performing phase alignment of the stepping motor when the information regarding the termination status is normal, and performing phase alignment of the stepping motor when the information regarding the termination status is abnormal, wherein the phase alignment of said stepping motor is a process for driving said stepping motor with a predetermined number of pulses to equalize a mechanical phase with an electrical phase of said stepping motor.

9. The recording apparatus according to claim 8, wherein said control means starts the phase alignment of the stepping motor based on the information regarding the final exciting phase when the information regarding the termination status is abnormal.

10. The recording apparatus according to claim 8, wherein said error is based on that said stepping motor comes out of step.

11. The recording apparatus according to claim 8, wherein said storage means is provided within said control means.

12. The recording apparatus according to claim 8, wherein the state of power on is shifted to the state of software power off if said apparatus is not in use for a long time.

13. A recording apparatus provided with driving means for driving a member to be driven as a driving source for a stepping motor, comprising:

storage means for storing and holding information regarding a final exciting phase of the stepping motor upon entering a software power off state in which consumption of electrical power by said recording apparatus is restricted by changing a condition of a clock signal to control said recording apparatus;

a sensor, said sensor detecting whether the driven member moves by a predetermined number of pulses when the predetermined number of pulses is applied to the stepping motor at a standby position; and control means for applying the predetermined number of pulses based on the information regarding the final exciting phase, read out from said storage means, without performing phase alignment of the stepping motor when said recording apparatus restarts from the software power off state, when said sensor detects movement by the predetermined number of pulses, and for performing phase alignment of the stepping motor when said sensor does not detect movement by the predetermined number of pulses, said control means performing a phase alignment of said stepping motor at a state hardware power off, wherein the phase alignment of said stepping motor is a process for driving said stepping motor with a predetermined number of pulses to equalize a mechanical phase with an electrical phase of said stepping motor.

14. A recording apparatus provided with driving means for driving a member to be driven as a driving source for a stepping motor, comprising:

storage means for storing and holding information regarding a final exciting phase of the stepping motor upon entering a software power off state in which consumption of electrical power by said recording apparatus is restricted by changing a condition of a clock signal to control said recording apparatus;

a sensor, said sensor detecting a rotation amount or a corresponding value of the stepping motor during the software power off state; and control means for determining, when said recording apparatus restarts from the software power off state, an excitation phase corresponding to a position of a rotor of the stepping motor at the time of the restart, based on the rotation amount of the stepping motor detected by said sensor and the information regarding the final exciting phase read from said storage means, and starting the excitation of the stepping motor from the determined excitation phase without performing phase alignment of the stepping motor, said control means performing a phase alignment of said stepping motor at a state of hardware power off, wherein the phase alignment of said stepping motor is a process for driving said stepping motor with a predetermined number of pulses to equalize a mechanical phase with an electrical phase of said stepping motor.

15. A recording apparatus provided with a stepping motor as an actuator to perform recording on the basis of image data inputted from an outside, said apparatus, comprising:

drive means for changing an exciting phase of the stepping motor to step-drive the stepping motor;

storage means for holding a final exciting phase of the stepping motor upon entering a software power off state;

second storage means capable of holding said image data at a state of power on and not holding said image data at a state of software power off; and control means for starting excitation of the stepping motor based on the exciting phase stored in said storage means at the time of restarting from the software power off state of said apparatus, said control means performing a phase alignment of said stepping motor at a state of hardware power off, wherein the phase alignment of said stepping motor is a process for driving said stepping motor with a predetermined number of pulses to equalize a mechanical phase with an electrical phase of said stepping motor.

16. The recording apparatus according to claim 12, wherein said storage means is a non-volatile memory.

17. A recording apparatus provided with a stepping motor as an actuator, comprising:

drive means for changing an exciting phase of the stepping motor to step-drive the stepping motor;

storage means for storing and holding information regarding a final exciting phase of the stepping motor upon entering a software power off state in which consumption of electrical power by said recording apparatus is restricted by changing a condition of a clock signal to control said recording apparatus;

phase alignment means for aligning a mechanical phase of the stepping motor and an electrical phase stored in said storage means;

a driven member driven by the stepping motor;

a sensor, said sensor detecting whether said driven member moves by a predetermined number of pulses from a standby position of the member; and control means for starting excitation of the stepping motor based on the information regarding the final exciting phase stored in said storage means to drive said driven member by the predetermined number of pulses at the time of restarting from the software power off state of said apparatus, without performing the phase alignment by said phase alignment means, when said sensor detects that said driven member is moved by the predetermined number of pulses, and performing the phase alignment by said phase alignment means when said sensor detects that said driven member is not moved by the predetermined number of pulses.

18. A recording apparatus provided with a stepping motor as an actuator to perform recording on the basis of image data inputted from an outside, said apparatus comprising:

drive means for changing an exciting phase of the stepping motor to step-drive the stepping motor;

storage means capable of holding information on a final exciting phase of said stepping motor at a state of software power off and holding information on a termination status indicating the presence/absence of an error in said recording apparatus at the transition to a software power off;

second storage means capable of holding said image data at a state of power on and not holding said image data at a state of software power off; and control means for starting excitation of the stepping motor from said final exciting phase stored in said storage means at the time of restarting from a software power off state of said apparatus, said control means performing a phase alignment of said stepping motor if information on the termination status is abnormal, wherein the phase alignment of said stepping motor is a process for driving said stepping motor with a predetermined number of pulses to equalize a mechanical phase with an electrical phase of said stepping motor.

* * * * *

UNITED STATES PATENT AND TRADEMARK OFFICE
CERTIFICATE OF CORRECTION

PATENT NO. : 6,963,415 B1
DATED : November 8, 2005
INVENTOR(S) : Hiroyuki Saito

It is certified that error appears in the above-identified patent and that said Letters Patent is hereby corrected as shown below:

Column 6,
Line 61, delete "be".

Column 9,
Line 22, "claim 12," should read -- claim 15, --.

Signed and Sealed this

Sixteenth Day of May, 2006

JON W. DUDAS
*Director of the United States Patent and Trademark Office*